United States Patent
Drtina

(10) Patent No.: US 7,457,426 B2
(45) Date of Patent: Nov. 25, 2008

(54) METHOD TO OPERATE A HEARING DEVICE AND ARRANGEMENT WITH A HEARING DEVICE

(75) Inventor: Peter Drtina, Winterthur (CH)

(73) Assignee: Phonak AG, Stafa (CH)

( * ) Notice: Subject to any disclaimer, the term of this patent is extended or adjusted under 35 U.S.C. 154(b) by 1128 days.

(21) Appl. No.: 10/172,333

(22) Filed: Jun. 14, 2002

(65) Prior Publication Data

US 2003/0231773 A1 Dec. 18, 2003

(51) Int. Cl.
*H04R 25/00* (2006.01)
(52) U.S. Cl. .................................. 381/313; 381/23.1
(58) Field of Classification Search ............. 381/23.1, 381/312–313, 356, 17–18, 26, 74, 309–310; 704/231, 271
See application file for complete search history.

(56) References Cited

U.S. PATENT DOCUMENTS 4,586,195 A * 4/1986 DeGeorge et al. ............. 381/92
5,539,859 A 7/1996 Dartois et al.
6,154,552 A 11/2000 Koroljow
6,424,721 B1 * 7/2002 Hohn ........................ 381/313

FOREIGN PATENT DOCUMENTS

| DE | 44 19 901 A | 2/1996 |
| DE | 199 48 907 | 2/2000 |
| EP | 0 942 627 A | 9/1999 |
| WO | 00 68703 | 11/2000 |

* cited by examiner

*Primary Examiner*—Xu Mei
(74) *Attorney, Agent, or Firm*—Pearne & Gordon LLP

(57) ABSTRACT

A hearing device has a transfer function adjustable by a set of parameters. The hearing device can have two microphones, a processing unit, and a speaker unit. A direction identification unit is operationally connected to the processing unit. Communication between a user of the hearing device and at least one reference person is ensured for changing positions of the user and/or the reference person. The transfer function is adjusted as a function of at least one current reference person direction by changing the set of parameters. The reference person direction encloses an angle with a reference plane of the user.

10 Claims, 3 Drawing Sheets

METHOD TO OPERATE A HEARING DEVICE AND ARRANGEMENT WITH A HEARING DEVICE

TECHNICAL FIELD

This invention relates to the field of hearing devices, whereby under the term hearing device also hearing aid devices must be understood, which are used to correct or compensate, respectively, hearing losses as well as devices used in the field of communication as e.g. radio devices. In addition, this invention relates in particular to behind-the-ear hearing devices (BTE), in-the-ear hearing devices (ITE) and implantable hearing devices.

BACKGROUND OF THE INVENTION

A method to operate a hearing device as well as an arrangement with a hearing device is known from DE 100 48 341 C1 for which a number of stationary transmitter units are provided to avoid misinterpretation of a current acoustic situation, which transmitter units are positioned in the area of an acoustic signal source and which transmitters transmit a source specific signal permanently or periodically. A receiver unit residing in the hearing device recognizes the information emitted from the signal source. In the hearing device, a best suitable hearing program is selected on the basis of the received information. For example, in order to recognize the hearing situation "office", a transmitter unit which emits an office-recognition signal, is positioned at one's workplace. If the hearing device user stays at or in the vicinity of his workplace the "office"—recognition signal will be received by the hearing device. As a consequence thereof, the hearing program "office" will be selected in the hearing device and the acoustic surround situation, as it normally appears in an office, will be taken into consideration.

Hence, the known teaching is basically a means to improve the recognition of specific acoustic surround situations. This means might improve the general hearing ability of the hearing device user in a surround situation if a transmitter unit is provided sending out a predefined recognition signal. In order to improve the hearing ability specifically, in particular to a reference person, the known teaching is not suitable.

In the German publication document DE 199 43 872 A1, an apparatus for speech control is described whereas specific acoustic signals are recorded to control a device with the aid of directional microphones. The characteristics of the directional microphones are adjusted with the aid of infrared movement detectors by determining the direction from which the acoustic signals come from with the movement detectors, and by adjusting the characteristics of the microphones thereafter. The known teaching works well if a single moving acoustic source exists. This teaching cannot be used to detect several moving acoustic sources. Besides, the known teaching requires two independent systems, namely one for determining the position of the acoustic source and one for recording the acoustic signals. Therefore, an implementation of the known teaching is a costly undertaking.

The European patent with the publication number EP-0 472 356 B1 discloses a speech recognition device to be used in automobiles. Thereby, operations usually carried out manually are replaced by automatic operations triggered by acoustic signals. The system is implemented using a direction-dependent microphone that ignores acoustic commands of a passenger, while any command of the driver is carried out. On the basis of the fixed position, to be known in advance, of the person submitting the command, namely the driver position, it is a system configured in advance without any possibility of later amendments.

Thus, it is desirable to provide a method to operate a hearing device for which method the aforementioned drawbacks do not occur, and for which method an improved communication becomes possible with a single person or with several reference people, even though the position changes of either the hearing device user and/or the reference person or the reference people.

SUMMARY OF THE INVENTION

For the operation of a hearing device having an adjustable transfer function being adjusted by changing a parameter set, a reference person direction is determined in order to ensure that communication between a hearing device user and at least one reference person can take place properly. The reference person direction is defined by the position of the reference person and the hearing device user viewed from the hearing device user. On the basis of the determined reference person direction the transfer function of the hearing device is adjusted by changing the parameter set in such a way that the direction characteristics of the hearing device is aligned with the reference person.

By processing of information regarding direction of a reference person in relation to the hearing device user in the hearing device, the possibility is provided to substantially improve the communication in every day life, in particular in the living area, more particularly between a hearing device user and his fellow occupants. By the present invention, the opportunity is given for a reference person to start and to lead a communication at any time and from any position with the hearing device user, and the reference person is not obliged to change his or her position in such a way that a conversation can be started at all. In particular, reference people having a close relationship to the hearing device user, which reference people have mostly initiated the use of a hearing device, are now confronted with the problem of starting a conversation. With the help of the present invention these circumstances could have been considerably improved.

BRIEF DESCRIPTION OF THE DRAWINGS

The present invention will be further explained by reference to drawings, which show an exemplified embodiment.

DETAILED DESCRIPTION OF THE INVENTION

Figure 1:
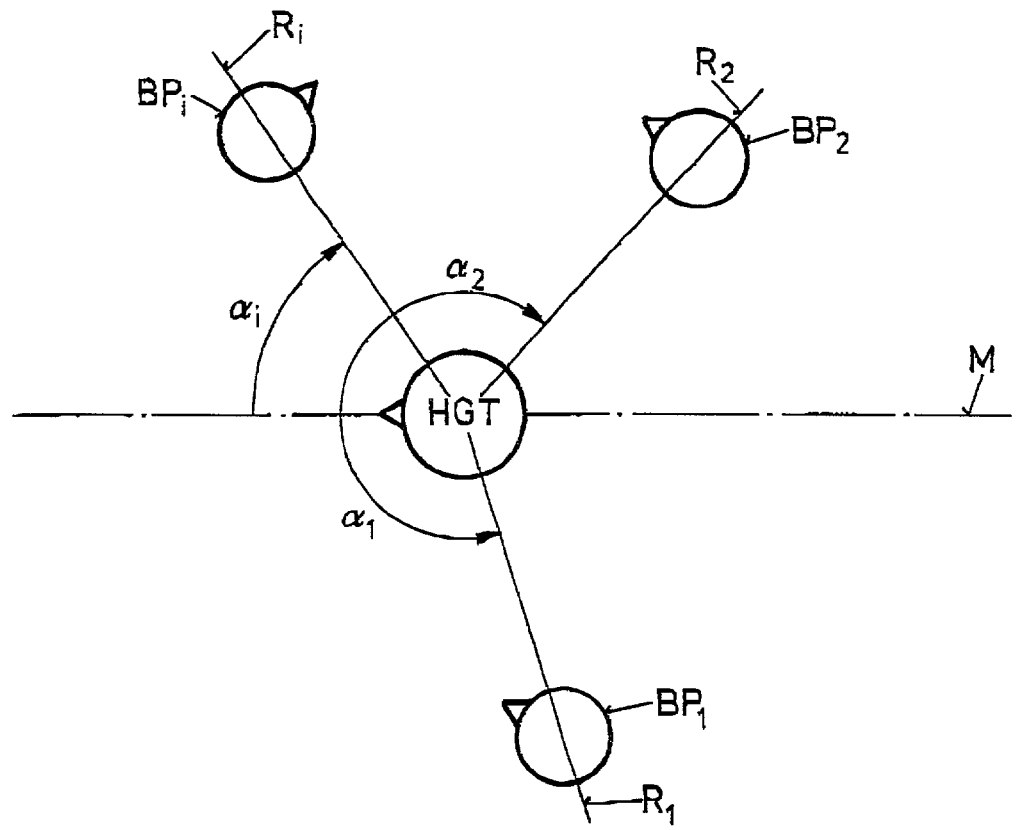
FIG. 1 schematically shows in top view a hearing device user and several reference people.

FIG. 1 shows, in a top view, a hearing device user HGT with a medial plane M, which corresponds to the body symmetric plane, and several reference people $BP_1$ to $BP_i$, which can move arbitrarily around the hearing device user HGT. Thereby, the reference people $BP_1$ to $BP_i$ are, viewed from the hearing device user HGT, in current reference person directions $R_1$ to $R_i$, which enclose an angle $\alpha_1$ to $\alpha_i$ with a reference plane, i.e., with the medial plane M of the hearing device user HGT. How a reference person $BP_1$ to $BP_i$ is aligned with the hearing device user HGT is, at first, without importance.

The method according to the present invention is characterized in that, in order to improve the communication between the hearing device user HGT and a or several reference people $BP_1$ to $BP_j$, but independent of a current position to each other, the reference person directions $R_1$ to $R_i$ are determined, and in that a transfer function in the hearing device is changed in function of the reference person directions $R_1$ to $R_i$. By referring to FIGS. 2 and 3, the method steps according to the present invention will be further explained in detail.

Figure 2:
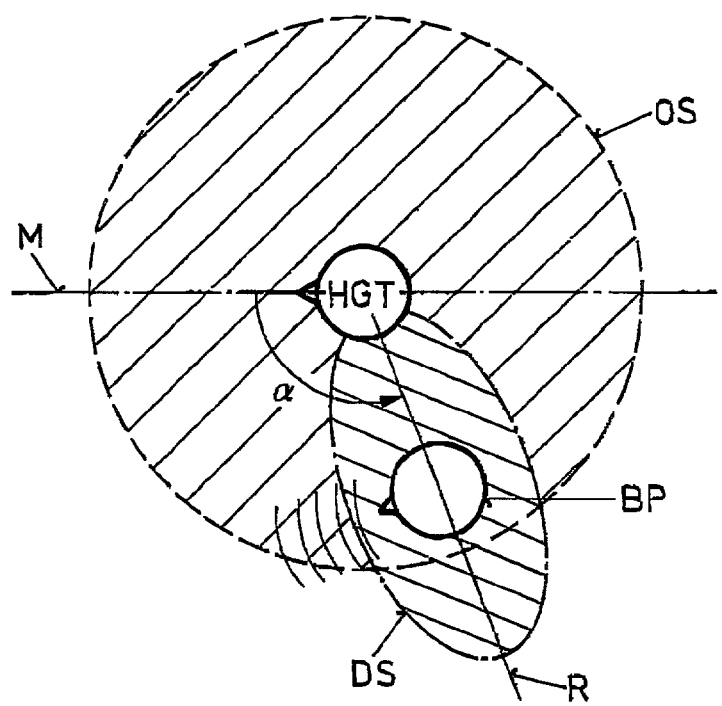
FIGS. 2 and 3 show, again in top view and schematically, a hearing device user and a reference person.

In FIG. 2, a hearing device user HGT is again represented. In order to simplify the explanations and in contrast to FIG. 1, only a single reference person BP is represented in FIG. 2. Viewed from the hearing device user HGT, the reference person BP can be found in reference person direction R. The medial plane M of the hearing device user HGT encloses an angle α with the reference person direction R. It becomes clear from the above-said that the medial plane M is a reference plane for the definition of the angle α. Of course, the reference plane does not need to be equal the medial plane M but can be in any direction starting from the hearing device user HGT.

By determining the reference person direction R, the possibility is obtained to change the acoustic behavior of the hearing device in such a way that acoustic signals coming from the reference person direction R are being processed preferentially or at least with a higher importance. In other words, the transfer function of the hearing device will be adjusted by changing parameters in order to obtain the above-mentioned result, which parameters determine the transfer function.

Figure 3:
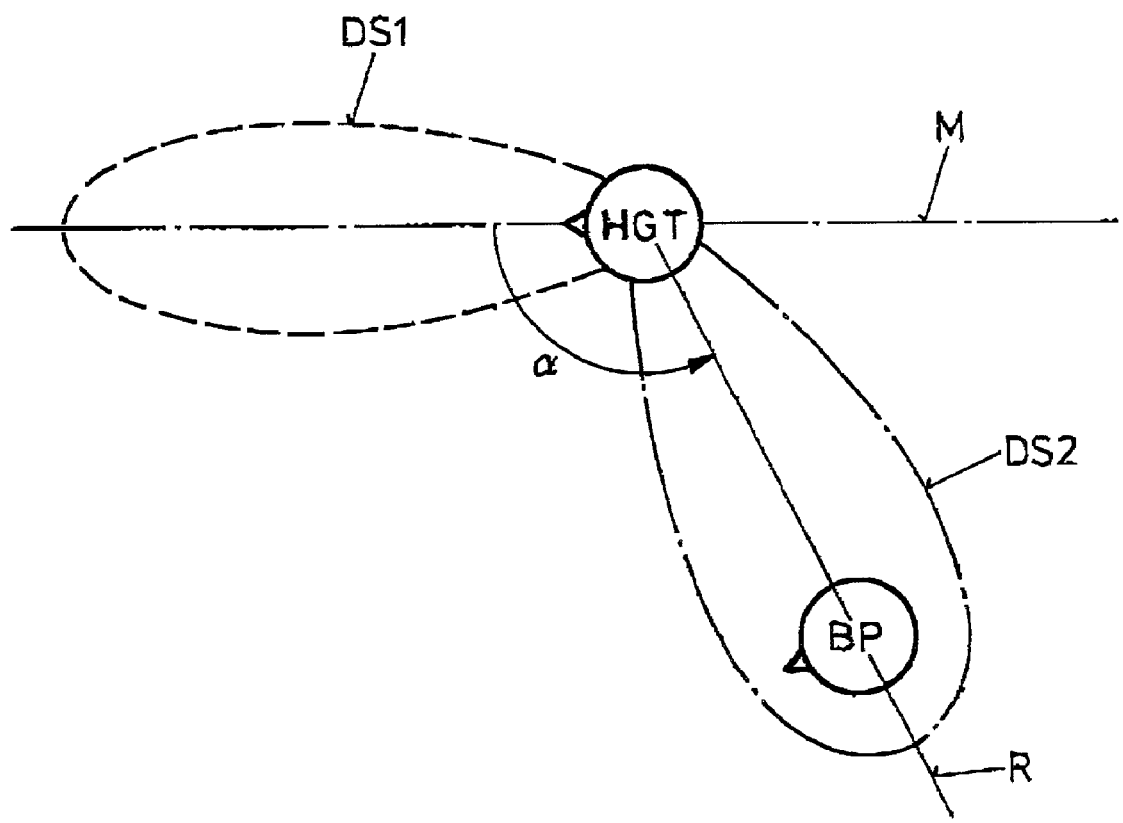

In order to further explain the above mentioned, two possible situations are represented in FIGS. 2 and 3. In FIG. 2, the hearing device of the hearing device user HGT is in a so-called "omni signal" modus OS. In this modus OS, all acoustic signals are treated equally, that means independent on the direction they arrive. In other words, all acoustic signals are weighted equally in the hearing device. In FIG. 2, this fact is represented by a dashed line hearing device characteristic. Accordingly, all acoustic signals recorded by a microphone are fed into the auditory canal after a possible processing in the hearing device.

In case that the reference person now starts to attract attention acoustically by starting a conversation with the hearing device user HGT, for example, besides acoustic signals of the reference person PB also noise, which arrives from other directions as from the reference person direction R, are fed into the auditory canal of the hearing device user HGT because of the "omni signal" modus OS. As a result thereof, the intelligibility is reduced, which will be improved immediately by switching from the "omni signal" modus OS into the "directional signal" modus DS in the hearing device. The "directional signal" modus DS is characterized by a receiver or amplifier characteristic, respectively, as it is represented in FIG. 2 by a chain line. Thereby, it is of utmost importance that the direction R is determined correctly, which direction R is the basis for the alignment of the hearing device characteristic. How the direction R of the reference person BP is determined will be explained below. First, the present invention will be further explained by a second situation represented in FIG. 3.

In contrast to the situation represented in FIG. 2, the hearing device according to FIG. 3 is in the "directional signal" modus DS1 (receiving characteristic indicated by a chain line). The plane of symmetry of the receiving characteristic thereby lies in the medial plane M of the hearing device user HGT.

The situation represented in FIG. 3 is obtained, for example, when the hearing device user HGT is sitting in front of a TV device and is mostly interested in the acoustic information which can be obtained together with image information from the TV device.

In case that the reference person SP now attracts attention by starting a conversation with the hearing device user HGT, for example, acoustic signals by the reference person BP, which signals arrive from the direction R, are hardly perceived by the hearing device user HGT because of the directional signal modus DS1. As a consequence thereof, the intelligibility is reduced, which is immediately improved, according to the present invention, by either switching from the direction signal modus DS1 to the directional signal modus DS2 in the hearing device, or by additionally switching in the directional modus DS2 to the already provided directional signal modus DS1. The directional signal modus DS2 is characterized by a receiver or amplifier characteristic, respectively, as it is represented in FIG. 3 by a chain line. It is of utmost importance that the direction R is determined correctly, which direction R is necessary to align the hearing device characteristic.

For the determination of the reference person directions $BP_1$ to $BP_j$ and BP, respectively (FIGS. 1 to 3), three methods are described in the following, each of the methods can be used for itself or in combination with one or more of the others.

The first method comprises the step of providing means to recognize the voice of a reference person in the hearing device. As soon as the reference person voice is determined, the direction from which such acoustic signals arrive can be determined. In a second step, the parameter set in the hearing device can be adjusted according to a desired direction characteristic as has been explained along with FIGS. 2 and 3.

The technique of speaker recognition is generally known. For further information, reference is made to a paper of S. Furui entitled "An Overview on Speaker Recognition Technology" ("Automatic Speech and Speaker Recognition: Advanced Topics", edited by C.-H. Lee, F. K. Soong, K. K. Paliwal, 1996, pages 31 to 56).

The technique speaker recognition is differentiated into two techniques: The first is called "Speaker Identification", of which it is the object to identify a speaker out of a number of several known speakers. The second technique is called "Speaker Verification", of which it is the object to check the identification of an already determined speaker. On the other hand, one differs between the methods of text-dependent and text-independent methods. By the text-dependent method, the system is trained by certain words (code words). The recognition is limited to these words. In an embodiment that includes the Speaker Identification technique, speaker identification takes place over a single predefined code word. The text-independent method functions for any words.

The speaker recognition is mostly based on the extraction of LPC-(Linear Prediction Coefficients) methods and their regression coefficients, The classification usually takes place with the aid of "Dynamic Time Warping" or "Hidden Markov Models" (HMM) for text-dependent systems, and with the aid of vector quantization, "Gaussian Mixture Models", HMMs or neuronal networks for text independent systems.

Further information can be found, for example, in the publication entitled "Discrete-Time Processing of Speech Signals" of J. R. Deller, J. H. L. Hansen and J. G. Proakis (IEEE Press, 2000).

All of the above mentioned methods can be used to detect a reference person, whereas the recognition of the reference person voice (text-independent method) as well as the recognition of keywords (text-dependent method) can be used in order to determine the direction of the reference person in relation to the hearing device user.

The first method is in particularly advantageous because the whole data processing takes place in the hearing device. There is no need for additional devices neither at a hearing device user nor at the reference person.

Figure 4:
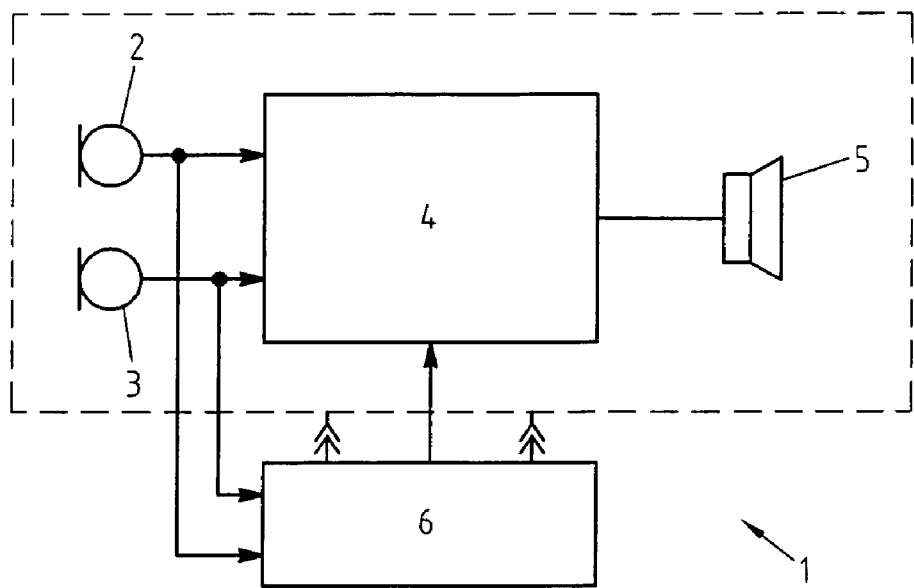
FIG. 4 shows a block diagram of a first embodiment of a hearing device according to the present invention.

In FIG. 4, a block diagram is shown of a hearing device 1 according to the present invention, which hearing device 1 is particularly suitable to implement the first method. Two microphones are indicated by the reference signs 2 and 3, with the aid of which acoustic signals are converted into corresponding electric signals which are fed to a processing unit 4 as well as to a direction identification unit 6 in the following. The direction identification unit 6 is operationally connected to the processing unit 4. The signal, processed in the processing unit 4 and, as the case may be, in the direction identification unit 6, is finally fed to an electro/acoustic converter 5 which is often also called speaker or hearer.

As shown schematically in FIG. 4, the direction identification unit 6 can be detachably connected to the hearing device 1.

To implement the second method, an additional emitter unit, in the following referred to as user unit, is used which emitter unit is in communication with a receiver unit in the hearing device either permanently or as need be. The reference person carries the user unit by which the hearing device or the receiving unit, integrated into the hearing device, can establish the direction in which the reference person is located. Possible implementations can be in particular based on the FM—(Frequency Modulation) technique.

The second method is in particular advantageous in that the user unit can be passed to another reference person without that a learning phase must be provided to train the recognition algorithm as must be done in the first described method.

The third method is rather close to the second method in that, instead of an active user unit which emits a signal, a passive user unit can be used in the manner of a so-called transponder. A transponder is a passive unit characterized in that a response signal is generated after a stimulation signal with a certain frequency reaches the transponder. An energy supply unit is therefore not necessary in such a user unit. This fact is advantageous over the second method described above.

Figure 5:
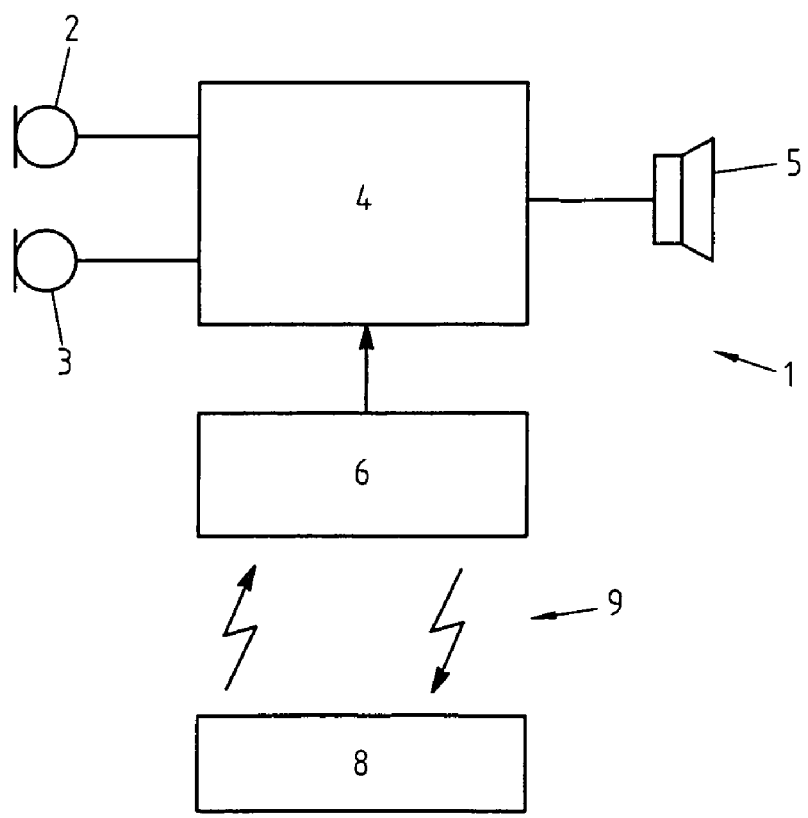
FIG. 5 shows a block diagram of a second embodiment of the hearing device according to the present invention.

In FIG. 5, a block diagram is shown of an arrangement with a hearing device 1 according to the present invention, which hearing device 1 is particularly suitable to implement the second and the third methods. Besides the two microphones 2 and 3, the hearing device again comprises the processing unit 4 and the direction identification unit 6. In contrast to what is shown in FIG. 4, the output signals of the microphones 2 and 3 are now only fed to the processing unit 4 and not to the direction identification unit 6. By the reference sign 8 a user unit is identified which comprises an active transmitter and receiver unit. Between the user unit 8 and the direction identification unit 6, a wireless link 9 is provided which is, for example, implemented using FM—(Frequency Modulation) technique. Other techniques, as for example infrared, can also be used.

To implement the third method, the user unit 8 is realized in a passive manner by using known transponder technology, for example.

Besides the three above mentioned methods to determine the reference person direction, reference is made to a known method to determine direction of arrival of acoustic signals (DOA). The known method and an arrangement are described in the publication document of the International Patent Application having publication number WO 00/68703 of the same applicant, the content of which application is hereby incorporated by reference. It has been shown that the use of the known teaching can also be used for the present invention.

Having thus shown and described what is at present considered to be the preferred embodiments of the invention, it should be noted that the same has been made by way of illustration and not limitation. Accordingly, all modifications, alterations and changes coming within the spirit and scope of the invention are herein meant to be included.

I claim:

1. A method to operate a hearing device having a transfer function adjustable by a set of parameters, the communication between a hearing device user, having a reference plane, and at least a reference person is in particular ensured for changing positions of the hearing device user and/or of the reference person, the method comprising the step that the transfer function of the hearing device is adjusted in function of at least a current reference person direction by changing the parameter set of the transfer function, whereby the reference person direction encloses an angle with the reference plane of the hearing device user, whereas the reference person carries a user unit which emits a predefined reference signal, and a direction identification unit is provided in the hearing device for receiving the predefined reference signal, the reference person direction being determined in the hearing device on the basis of the direction-sensitive information of the direction identification unit.

2. A method to operate a hearing device having a transfer function adjustable by a set of parameters, the communication between a hearing device user, having a reference plane, and at least a reference person is in particular ensured for changing positions of the hearing device user and/or of the reference person, the method comprising the step that the transfer function of the hearing device is adjusted in function of at least a current reference person direction by changing the parameter set of the transfer function, whereby the reference person direction encloses an angle with the reference plane of the hearing device user, whereas a predefined stimulation signal is generated and emitted by the hearing device, which simulation signal excites a transponder unit provided in the vicinity of the reference person, the transponder unit generating a response signal after excitation, and a direction identification unit is being provided in the hearing device, which direction identification unit receives the response signal, and the desired reference person direction is being determined in the hearing device on the basis of the direction-sensitive information of the direction identification unit.

3. A method to operate a hearing device having a transfer function adjustable by a set of parameters, the communication between a hearing device user, having a reference plane, and at least a reference person is in particular ensured for changing positions of the hearing device user and/or of the reference person, the method comprising the step that the transfer function of the hearing device is adjusted in function of at least a current reference person direction by changing the parameter set of the transfer function, whereby the reference person direction encloses an angle with the reference plane of the hearing device user and the current reference person direction is determined by a Speaker Recognition Method, wherein the Speaker Recognition Method identifies the speaker and the speaker identification takes place over a single predefined codeword.

4. An arrangement with a hearing device with at least two microphones, a processing unit and a speaker unit, the microphones as well as the speaker unit are connected to the processing unit, whereas a direction identification unit is provided, which is operationally connected to the processing unit, whereas the direction identification unit comprises a receiver unit and whereas a reference person carries an emitter unit or is in the vicinity of the emitter unit, and further whereas the emitter unit generates a predefined reference signal that is receivable by the receiver unit, wherein the hearing device includes a transfer function adjustable by a set of parameters and communication between a hearing device user, having a reference plane, and the reference person is ensured for changing positions of the hearing device user and/or of the reference person, and wherein the transfer function of the hearing device is adjusted in function of at least a current reference person direction by changing the parameter set of the transfer function, whereby the reference person direction encloses an angle with the reference plane of the hearing device user, and further wherein the reference person direction is determined in the hearing device based on direction-sensitive information of the direction identification unit.

5. The arrangement according to claim 4, whereas the direction identification unit is operationally connected to the microphones.

6. An arrangement with a hearing device with at least two microphones, a processing unit and a speaker unit, the microphones as well as the speaker unit are connected to the processing unit, whereas a direction identification unit is provided, which is operationally connected to the processing unit, whereas the direction identification unit comprises an emitter unit as well as a receiver unit and whereas a transponder unit is provided in the vicinity of a reference person, wherein the hearing device includes a transfer function adjustable by a set of parameters and communication between a hearing device user, having a reference plane, and the reference person is ensured for changing positions of the hearing device user and/or of the reference person, and wherein the transfer function of the hearing device is adjusted in function of at least a current reference person direction by changing the parameter set of the transfer function, whereby the reference person direction encloses an angle with the reference plane of the hearing device user, and wherein the emitter unit emits a predefined stimulation signal which excites the transponder unit and the transponder unit generates a response signal after excitation, said response signal being received by the receiver unit of the direction identification unit, and further wherein a desired reference person direction is determined in the hearing device based on direction-sensitive information of the direction identification unit.

7. The arrangement according to claim 6, whereas the direction identification unit is operationally connected to the microphones.

8. The arrangement as in any one of claims 4, 5, 6, and 7, whereas the direction identification unit is integrated into the hearing device.

9. The arrangement as in any one of claims 4, 5, 6, and 7, whereas the direction identification unit is detachably connected to the hearing device.

10. A method to operate a hearing device having a transfer function adjustable by a set of parameters, the communication between a hearing device user, having a reference plane, and at least a reference person is in particular ensured for changing positions of the hearing device user and/or of the reference person, the method comprising the step that the transfer function of the hearing device is adjusted in function of at least a current reference person direction by changing the parameter set of the transfer function, whereby the reference person direction encloses an angle with the reference plane of the hearing device user and the current reference person direction is determined by a Speaker Recognition Method, wherein the Speaker Recognition Method includes the steps of recognizing a word spoken by the current reference person and identifying the current reference person.

\* \* \* \* \*

UNITED STATES PATENT AND TRADEMARK OFFICE
CERTIFICATE OF CORRECTION

PATENT NO. : 7,457,426 B2  Page 1 of 1
APPLICATION NO. : 10/172333
DATED : June 14, 2002
INVENTOR(S) : Peter Drtina It is certified that error appears in the above-identified patent and that said Letters Patent is hereby corrected as shown below:

In the Specification, column 4, line 6, please replace the word "SP" with -- BP --.

In the Specification, column 5, line 48, please insert the number --1 -- after "device" and before "again."

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,457,426 B2  Page 1 of 1
APPLICATION NO. : 10/172333
DATED : November 25, 2008
INVENTOR(S) : Peter Drtina It is certified that error appears in the above-identified patent and that said Letters Patent is hereby corrected as shown below:

In the Specification, column 4, line 6, please replace the word "SP" with -- BP --.

In the Specification, column 5, line 48, please insert the number -- 1 -- after "device" and before "again.".

This certificate supersedes the Certificate of Correction issued March 17, 2009.

Signed and Sealed this

Seventh Day of April, 2009

JOHN DOLL
*Acting Director of the United States Patent and Trademark Office*